UNITED STATES PATENT OFFICE.

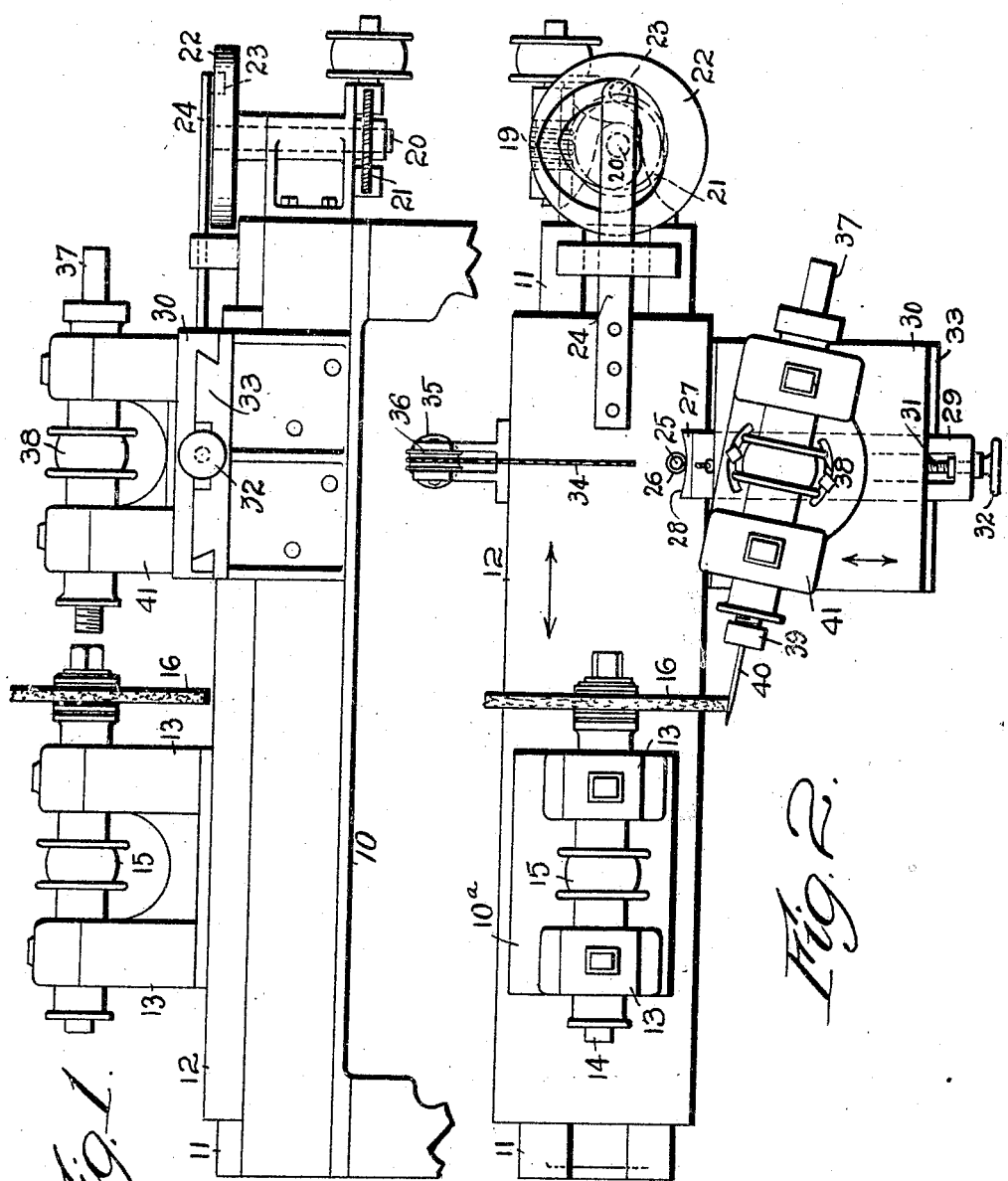

HAROLD WM. HODGSON, OF WORCESTER, MASSACHUSETTS.

PUNCH-GRINDING MACHINE.

1,377,481. Specification of Letters Patent. Patented May 10, 1921.

Application filed August 5, 1920. Serial No. 401,343.

*To all whom it may concern:*

Be it known that I, HAROLD W. HODGSON, a subject of the King of Great Britain, residing at Worcester, in the county of Worcester and State of Massachusetts, have invented a new and useful Punch-Grinding Machine, of which the following is a specification.

This invention relates to a machine for grinding punches and reamers for use in forming and shaping the dies through which wire is drawn.

The principal objects of the invention are to provide a machine, operating with a cylindrical stone and using the edge thereof, to grind any desired taper, any curve, and any shape of point for dry drawing or wet drawing as may be desired; to provide means for getting the desired shape by moving both the grinding stone and the chuck for holding the steel to be ground; and to improve and simplify previous machines for this general purpose. Further objects and advantages of the invention will appear hereinafter.

Reference is to be had to the accompanying drawings, in which—

Figure 1 is a side view of a punch grinding machine constructed in accordance with this invention, and Fig. 2 is a plan of the same.

The machine is shown as comprising a base or stand 10, provided with a longitudinal pair of ways or guide 11. Longitudinally on this guide moves a slide 12 on which is a head 10ª. The head carries bearings 13 for the grinding shaft 14 which is driven through a pulley 15 by a belt from overhead or in any other way. This shaft is provided with a grinding wheel 16 of cylindrical form such as is ordinarily used for the purpose of this machine. The grinding takes place on the edge of this wheel or stone instead of its side. Any kind of ordinary stone can be used, including small grinding stones and emery wheels.

The motion of this head is obtained by means of a vertical shaft 20 driven from a worm wheel 21, operated by a worm 19. These parts are mounted on the frame 10 or a bracket supported by it. The shaft 20 is provided with a so-called double heart cam 22, that is a cam having a heart-shaped groove in it for moving a pin 23. This pin is connected by an arm 24 with the slide 12 and causes its head to reciprocate with a predetermined motion, the speed of reciprocation increasing constantly.

On the slide 12 is a pin 25 carrying a roller 26 which reciprocates with the sliding head. This roller is adapted to engage a steel former 27 which has an operating surface 28 that may be given any desired shape to control the parts connected therewith. This is mounted on an adjusting member 29 movable transversely on a slide 30. This member 29 is adjustably connected with the slide by a screw 31 having a hand wheel 32 for adjusting it. The slide 30 is mounted to move transversely and freely on ways 33. It can be moved back by the former 27 coming in contact with the roller 26. A chain or cable 34 is shown having a weight 35 on it passing over a pulley 36 for always forcing the slide back so that the former is always in contact with the roller.

On this slide 30 is mounted a pivotally adjustable head 41 having bearings for a shaft 37. This shaft has a pulley 38 which is driven by a belt or otherwise and has a chuck 39 for carrying the steel 40 constituting a blank that is to be ground on the edge of the wheel 16.

The location of the former with respect to the roller 26 is such that the steel 40 may be located at the edge of the grinding wheel as indicated especially in the plan, Fig. 2. As the slide 12 reciprocates longitudinally in a predetermined manner positively controlled by the cam 22, the former also will reciprocate transversely. This brings the steel toward and from the edge of the wheel in such manner as is determined by the shape of the former 27. Therefore, the steel or punch 40 can be ground to any desired kind of point or any curve or taper that may be desired, and all punches produced from a single setting of the parts will be alike.

The principle of this invention is also capable of being used for grinding other articles than the one specifically mentioned, and I do not wish to be limited to the grinding of this particular article or to the details of construction, except as expressed in the claims.

Having thus described my invention what I claim is:—

1. In a punch or reamer grinding machine, the combination of a slide, a head, a shaft mounted in bearings thereon, a grinding wheel carried by said shaft, means for moving said slide longitudinally, a transversely movable slide, a head swiveled on the second slide, a chuck on the last named head for holding the blank to be ground, continuously acting means for moving the second slide transversely, a roller on the first slide, and a former on the second slide engaging the roller for controlling the effect of said continuously acting means.

2. In a grinding machine of the character described, the combination of a movable slide, a head thereon, a cam, means connected with the cam for reciprocating the slide, a grinding wheel carried by the head, rotatable on an axis parallel with the direction of reciprocation of the slide, a chuck for carrying the work to be ground located in position to hold the work on the edge of the grinding wheel, a former movable transversely with said chuck, and a roller mounted on said slide and engaging said former for causing a relative transverse motion between said chuck and wheel.

3. In a grinding machine, the combination with a base or frame having ways longitudinally located thereon, of a head mounted to slide on said ways, a rotatable cylindrical grinding wheel carried by said head, means for positively reciprocating said head along the ways with a variable speed, and transversely movable means for rotatably supporting the work to be ground on the cylindrical edge of the wheel, said movable means also being adjustable about an axis located transverse to both of said directions of motion.

4. In a grinding machine, the combination of a longitudinally movable head, a double heart cam, means connected with the cam for operating the head, a rotatable grinding wheel carried by the head, a chuck for carrying the work to be ground located in position to hold the work at the edge of the grinding wheel, a roller movable with the head, a former provided with a surface for engaging the roller and controlling the transverse motion of the chuck, and means for holding the former in contact with said roller.

5. In a grinding machine, the combination with a base or frame having ways located thereon, a head mounted to slide on said ways, a rotatable grinding wheel carried by said head, and means for reciprocating said head along the ways with a variable speed, of a transversely movable chuck for rotatably supporting the work to be ground on the edge of the wheel, a transversely movable slide for supporting said chuck, a former adjustably mounted on said slide to move therewith and having a forming surfact, and means connected with said head controlling the motion of said former and slide.

6. In a grinding machine, the combination with a head, a shaft mounted in bearings thereon, a grinding wheel carried by said shaft, means for moving said head longitudinally, a chuck for holding the blank to be ground, means for moving the blank transversely, a former having a surface for controlling the motion of said chuck, said former being connected therewith, and means movable with the head for engaging said former and thus controlling the transverse motion of said former and chuck.

In testimony whereof I have hereunto affixed my signature.

HAROLD WM. HODGSON.